United States Patent
Kelly et al.

(10) Patent No.: US 10,842,166 B2
(45) Date of Patent: Nov. 24, 2020

(54) METHOD AND DEVICE FOR ROASTING PARTIALLY ROASTED COFFEE BEANS

(71) Applicant: KONINKLIJKE PHILIPS N.V., Eindhoven (NL)

(72) Inventors: Declan Patrick Kelly, Eindhoven (NL); Jingwei Tan, Eindhoven (NL); Yanyan Wang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 71 days.

(21) Appl. No.: 15/111,015

(22) PCT Filed: Jan. 15, 2015

(86) PCT No.: PCT/EP2015/050619
§ 371 (c)(1),
(2) Date: Jul. 12, 2016

(87) PCT Pub. No.: WO2015/110337
PCT Pub. Date: Jul. 30, 2015

(65) Prior Publication Data
US 2016/0338376 A1    Nov. 24, 2016

(30) Foreign Application Priority Data

Jan. 23, 2014  (WO) ................. PCT/CN2014/000083
Apr. 11, 2014  (EP) ...................................... 14164419

(51) Int. Cl.
*A23F 5/04* (2006.01)
*A47J 31/42* (2006.01)
(Continued)

(52) U.S. Cl.
CPC ................ *A23F 5/04* (2013.01); *A23N 12/08* (2013.01); *A47J 31/42* (2013.01); *A23F 5/08* (2013.01);
(Continued)

(58) Field of Classification Search
CPC .. A23F 5/04; A23F 5/043; A23F 5/046; A23F 5/10; A23F 5/00; A23F 5/02;
(Continued)

(56) References Cited

U.S. PATENT DOCUMENTS 2,154,963 A * 4/1939 Swager .................... A47J 31/42
241/101.2
3,640,726 A * 2/1972 Bolt .......................... A23F 5/04
426/595

(Continued)

FOREIGN PATENT DOCUMENTS

CN    102232797 A    11/2011
CN    202504139 U    10/2012
(Continued)

OTHER PUBLICATIONS http://wiki.triestecoffeecluster.com/index.php?title=Roasting#High_yield_or_fast_roasting.

(Continued)

*Primary Examiner* — Drew E Becker
*Assistant Examiner* — Bryan Kim
(74) *Attorney, Agent, or Firm* — Schott, P.C.

(57) ABSTRACT

A roasting device and method of roasting partially roasted coffee beans includes acts of obtaining a roast level of the partially roasted coffee beans; determining a roasting profile for roasting based on at least the roast level of the partially roasted coffee beans prior to roasting; and roasting the partially roasted coffee beans according to the determined roasting profile.

10 Claims, 3 Drawing Sheets

(51) Int. Cl.
| | |
|---|---|
| *A23N 12/08* | (2006.01) |
| *A23F 5/26* | (2006.01) |
| *A23N 12/12* | (2006.01) |
| *A23F 5/08* | (2006.01) |
| *A47J 31/44* | (2006.01) |

(52) U.S. Cl.
CPC ............. *A23F 5/262* (2013.01); *A23N 12/125* (2013.01); *A47J 31/4492* (2013.01)

(58) Field of Classification Search
CPC .. A23F 5/46; A47J 37/04; A47J 37/044; A47J 37/045; A47J 37/046; A47J 37/047; A47J 31/42; A47J 31/4407; A47J 31/44; A47J 31/4403; A47J 31/449252; A47J 31/521; A47J 31/525; A47J 31/5253; A23N 12/08; A23N 12/083; A23N 12/10; A23N 12/12; A23N 12/125; A23N 12/086; A23L 5/13; A23L 5/15; A23L 5/17; A23L 5/10; A23L 5/19
USPC ........ 426/665, 520, 523, 465, 466, 467, 233
See application file for complete search history.

(56) References Cited

U.S. PATENT DOCUMENTS

| | | | | |
|---|---|---|---|---|
| 3,762,930 | A * | 10/1973 | Mahlmann | A23F 5/04 426/432 |
| 4,494,314 | A | 1/1985 | Gell, Jr. | |
| 4,737,376 | A * | 4/1988 | Brandlein | A23N 12/10 426/466 |
| 4,857,351 | A * | 8/1989 | Neilson | A23F 5/04 426/533 |
| 4,925,682 | A * | 5/1990 | Miya | A23F 5/04 229/117.22 |
| 4,949,632 | A * | 8/1990 | Camerini Porzi | A23N 12/12 34/364 |
| 5,960,561 | A | 10/1999 | Parodi | |
| 6,106,877 | A * | 8/2000 | Allington | A23F 5/04 426/233 |
| 7,285,300 | B1 * | 10/2007 | Allington | A23N 12/08 426/233 |
| 7,455,867 | B1 * | 11/2008 | Gutwein | A47J 31/002 426/594 |
| 7,838,799 | B2 | 11/2010 | Freedman | |
| 8,734,877 | B2 * | 5/2014 | Homme | F24C 14/00 426/233 |
| 9,936,835 | B2 * | 4/2018 | Alshammary | A23F 5/08 |
| 2001/0044750 | A1 * | 11/2001 | Piotrowski | G06Q 30/02 705/26.1 |
| 2003/0180419 | A1 | 9/2003 | Calderone | |
| 2004/0142078 | A1 | 7/2004 | Eichner | |
| 2008/0008787 | A1 | 1/2008 | Kincs et al. | |
| 2008/0089986 | A1 | 4/2008 | Song | |
| 2009/0130277 | A1 * | 5/2009 | Bressner | A23N 12/08 426/466 |
| 2009/0304886 | A1 * | 12/2009 | Greenfield | A23F 5/04 426/467 |
| 2010/0051602 | A1 | 3/2010 | Beardsley et al. | |
| 2010/0086653 | A1 * | 4/2010 | Fedele | A47J 31/002 426/231 |
| 2012/0034350 | A1 * | 2/2012 | Gard | H05B 6/6411 426/242 |
| 2013/0180406 | A1 | 7/2013 | Hay | |
| 2013/0189405 | A1 * | 7/2013 | Filliol | A47J 31/525 426/231 |
| 2013/0209638 | A1 * | 8/2013 | Sewell | A23N 12/08 426/466 |
| 2013/0276637 | A1 | 10/2013 | Stordy et al. | |
| 2014/0076167 | A1 * | 3/2014 | Boggavarapu | A47J 31/42 99/286 |
| 2014/0242239 | A1 * | 8/2014 | Boggavarapu | A47J 31/42 426/433 |
| 2015/0314952 | A1 * | 11/2015 | Empl | B65D 85/8043 426/115 |

FOREIGN PATENT DOCUMENTS

| | | |
|---|---|---|
| CN | 203234007 U | 10/2013 |
| CN | 103504453 A | 1/2014 |
| EP | 1041891 B1 | 9/2007 |
| GB | 397727 A | 8/1933 |
| JP | H02-72828 A | 3/1990 |
| JP | H04-311349 A | 11/1992 |
| JP | H06-303906 A | 11/1994 |
| JP | 2502747 B2 | 5/1996 |
| JP | 2001-522593 A | 11/2001 |
| JP | 2009-268428 A | 11/2009 |
| WO | 9923888 A1 | 5/1999 |
| WO | 2006/034203 A2 | 3/2006 |
| WO | 2006/108578 A1 | 10/2006 |
| WO | 2014043652 A1 | 3/2014 |

OTHER PUBLICATIONS p. 187, Espresso Coffee: The Science of Quality, Illy Andrea, Viani Rinantonio, Academic Press.
"Bonaverde Project Video", Oct. 28, 2013, XP054975795, Retrieved from the Internet: URL: https://vimeo.com/78012398 [Retrieved Mar. 23, 2015], passage between minute 2 and minute 3.
"User Experience the Swipe & Brew Technology" Aug. 21, 2014, XP055178068, Retrieved from the Internet: URL:https://www.bonaverde.com/InsideKickstarter.pdf, [Retrieved on Mar. 20, 2015], the whole document.
First Office Action issued in connection with corresponding 201580005566.6, dated Aug. 6, 2018, 22 pages.
Office Action issued in connection with corresponding 2016-547068, dated Oct. 23, 2018, 9 pages.
Office Action issued in connection with corresponding 15700315.3, dated Nov. 26, 2018, 6 pages.
Second Office Action issued in connection with corresponding 201580005566.6, dated Feb. 27, 2019, 25 pages.

\* cited by examiner

METHOD AND DEVICE FOR ROASTING PARTIALLY ROASTED COFFEE BEANS

This application is the U.S. National Phase application under 35 U.S.C. § 371 of the International Application No, PCE/EP2015/050619, filed on Jan. 15, 2015, which claims the benefit of International Application No. PCT/CN2014/000083 filed on Jan. 23, 2014 and International Application No. 14164419.5 filed on Apr. 11, 2014. These applications are hereby incorporated by reference herein.

FIELD OF THE INVENTION

The invention relates to a method and a machine for making coffee, in particular, a method and a device for roasting partially roasted coffee beans.

BACKGROUND OF THE INVENTION

Enjoying fresh coffee is becoming very popular with consumers. Fresh roasting is especially in demand. However, current home roasters provide consumers limited possibilities to deliver a desired coffee taste.

Coffee beans can infuse a cup of coffee with a variety of tastes, flavors and textures, depending on three main factors, i.e. coffee bean variety, roast level and brewing format. Different bean species impart different flavors to coffee drinks The roast level impacts the final coffee flavor and taste, including acidity, bitterness, body, astringency, sweetness etc. In combination with a suitable brewing format, premium coffee drinks are delivered and are becoming popular worldwide. Current home roasters focus on end-user convenience. These home roasters normally have pre-set roasting profiles, leaving few parameters for end-users to adjust, such as roasting time and temperature. In other words, end users are not allowed to adjust the roasting profile to make coffee drinks with a desirable taste.

Roasting green coffee beans will take up much time. If consumers want a very fast roasting process, an extremely high temperature will be required (normally higher than 300° C.). Table 1 shows a current fast roasting process. And this very short roasting process normally will not yield a balanced, good roasting quality, since the surface will be over-roasted and the core of the bean will be still greenish.

TABLE 1

| Current fast roasting | |
|---|---|
| Type | Characteristics |
| Rotating cylinder | Horizontal/vertical |
| | With/without perforated walls |
| | Direct heating by convective flow of hot gases |
| | Indirect heating by hot drum walls |
| | Batch-operated |
| | Continuously operated by an inner conveyer |
| | Gas temperature: 400-550° C. |
| | Roasting time: 8.5-20 min |
| Bowl | Direct heating by convective flow of hot gases |
| | Continuously operated across the gas stream; |
| | Gas temperature: 480-550° C. |
| | Roasting time: 3-6 min |
| Fixed drum | Direct heating by convective flow of hot gases |
| | Batch operated |
| | Gas temperature: 400-450° C. |
| | Roasting time: 3-6 min |
| Fluidized bed | Direct heating by fluidizing gas |
| | Batch operated |
| | Gas temperature: 240-270° C. |
| | Roasting time: 5 min |

TABLE 1-continued

| Current fast roasting | |
|---|---|
| Type | Characteristics |
| Spouted bed | Direct heating by fluidizing gas |
| | Batch operated |
| | Fast roasting: Gas temperature: 310-360° C.; |
| | Roasting time: 1.5-6 min |
| | Slow roasting: Gas temperature: 230-275° C.; |
| | Roasting time: 10-20 min |
| Swirling bed | Tangential gas inlet |
| | Spiral upward motion of the beans |
| | Direct heat transfer of a moved packed bed |
| | Gas temperature: 280° C. |
| | Roasting time: 1.5-3 min |

SUMMARY OF THE INVENTION

It would thus be advantageous to provide a method and a device for roasting partially roasted coffee beans.

In the context, "partially roasted" means that those coffee beans have already been pre-roasted to a certain roast level, which roast level is not a final roast level (i.e., a level attained after completion of the roasting process). Moreover, the term "final roasting level" refers to a level where the roasted coffee beans are expected to be roasted to. In order to address one or more of the abovementioned concerns, according to an aspect of the invention, an embodiment of the invention provides a roasting method of roasting partially roasted coffee beans; the roasting method comprises the steps of: obtaining a roast level of the partially roasted coffee beans; determining a roasting profile for roasting based on at least the roast level of the partially roasted coffee beans prior to roasting; and roasting the partially roasted coffee beans according to the determined roasting profile.

The basic idea of the present invention is to roast partially roasted coffee beans to a predetermined final roast level. This can in principle overcome one or more of the disadvantages in conventional home roasters as described above: firstly, partially roasted coffee beans with a certain moisture content are easy to preserve; secondly, unlike current fast roasting processes which make the roasting unhomogeneous, the fast roasting process according to the invention will not only make the roasting period very short (the required energy will be less), but will also cause the beans to be much more homogeneously roasted. Since the partially roasted coffee beans have already been roasted (e.g., not exceeding the first crack), less heat will be needed for roasting the beans to the predetermined final roast level. Therefore, intensive heating will be avoided, which will otherwise probably cause unhomogeneous roasting. The roasting result is thus comparable to or better than the standard roast. This method is especially suitable to roast small volumes of coffee beans, and to be implemented in home-use integrated coffee machines.

Preferably, the roast level of partially roasted coffee beans is a level achieved before the end of the first crack.

In a preferred embodiment of the invention, the roast level of the partially roasted coffee beans is indicated by at least one of moisture content, density and color of the partially roasted coffee beans.

Preferably, the step of obtaining comprises: sensing at least one of: moisture content, density and color of the partially roasted coffee beans; or recognizing the roast level of the partially roasted coffee beans by means of an indicator.

In a preferred embodiment of the invention, the roasting profile for roasting is determined based on the roast level of the partially roasted coffee beans and a predetermined final roast level.

In an embodiment of the invention, the step of roasting comprises applying heat to the partially roasted coffee beans having an ambient temperature which ranges from about 190° C. to about 230° C., and/or transferring thermal energy of less than about 15 J to each partially roasted coffee bean.

Preferably, the predetermined final roast level is indicated by at least one of: moisture content, density and color of the partially roasted coffee beans; and the predetermined final roast level is adjustable according to user preference. Preferably, the roasting method further comprises: sensing the roast level during the step of roasting; and stopping roasting when the predetermined final roast level is achieved.

According to another aspect of the invention, an embodiment of the invention provides a method of making coffee, the method comprising: the roasting method of roasting partially roasted coffee beans as described above; grinding the coffee beans of the predetermined final roast level into coffee powder; and brewing coffee from the coffee powder.

With such a configuration, a very short bean-to-cup time and thus instantly fresh-brewed coffee is available, since the fast roasting process according to the invention will not only make the roasting period very short (the required energy will be less), but will also result in beans that are much more homogeneously roasted. This method is especially suitable to make small volumes of coffee, and to be implemented in home-use, integrated coffee machines.

According to yet another aspect of the invention, a roasting device for roasting partially roasted coffee beans is proposed, the roasting device comprising: an obtaining unit for obtaining a roast level of the partially roasted coffee beans; a determining unit for determining a roasting profile for roasting based on at least the roast level of the partially roasted coffee beans prior to roasting; and a roasting unit for roasting the partially roasted coffee beans according to the determined roasting profile.

This roasting device is especially suitable to be integrated in home-use coffee machines. With such a roasting device, the roasting process will be very short, the required energy will be less, and the roast is much more homogeneous.

Preferably, the roast level of the partially roasted coffee beans is indicated by at least one of moisture content, density and color of the partially roasted coffee beans; the obtaining unit comprises: a sensing element for sensing at least one of moisture content, density and color of the partially roasted coffee beans; or a recognizing element for recognizing the roast level of the partially roasted coffee beans by means of an indicator.

In an embodiment of the invention, the roasting unit roasts the partially roasted coffee beans according to a roasting profile, which is determined based on the roast level of the partially roasted coffee beans and the predetermined final roast level.

In an embodiment of the invention, the recognizing element is adapted for recognizing the roast level of the partially roasted coffee beans and/or the predetermined final roast level, and/or is adapted for selecting the roasting profile.

In an embodiment of the invention, the roasting unit is adapted for applying heat to the partially roasted coffee beans having an ambient temperature which ranges from about 190° C. to about 230° C., and/or for transferring thermal energy of less than about 15 J to each partially roasted coffee bean.

According to still another aspect of the invention, a coffee machine is proposed, the coffee machine comprising: the roasting device for roasting partially roasted coffee beans as described above; a grinding device for grinding the coffee beans of the predetermined final roast level to coffee powder; and a brewing device for brewing coffee from the coffee powder.

Such a coffee machine potentially makes it possible to instantly brew coffee directly from partially roasted coffee beans.

These and other aspects of the invention will be apparent from and elucidated with reference to the embodiments described hereinafter. However, the invention is not limited to these exemplary embodiments.

BRIEF DESCRIPTION OF THE DRAWINGS

The present invention will now be described based on various embodiments with reference to the accompanying drawings, in which.

DETAILED DESCRIPTION OF EMBODIMENTS

Reference will now be made to embodiments of the disclosure, one or more examples of which are illustrated in the figures. The embodiments are provided by way of explanation of the disclosure, and are not meant as a limitation of the disclosure. For example, features illustrated or described as part of one embodiment may be used with another embodiment to yield a still further embodiment. It is intended that the disclosure encompass these and other modifications and variations as come within the scope and spirit of the disclosure.

In order to address one or more of the abovementioned concerns, according to an aspect of the invention, an embodiment of the invention provides a roasting method of roasting partially roasted coffee beans; the roasting method comprises the steps of: obtaining a roast level of the partially roasted coffee beans; determining a roasting profile for roasting based on at least the roast level of the partially roasted coffee beans; and roasting the partially roasted coffee beans according to the determined roasting profile.

The roasting method according to the embodiment of the invention is unlike current fast roasting methods which use very high temperatures (more than 300° C.).

Preferably, the roast level of partially roasted coffee beans is the level attained before the end of the first crack. The Maillard reaction is a nonenzymatic reaction between sugars and proteins that occurs upon heating and that causes browning of some foods (such as coffee beans, meat and bread). Said Maillard reaction will be caused during the roasting process of coffee beans. After the first crack of coffee beans, perfume will be released from the beans. To preserve the perfume generated from said Maillard reaction, the partially roasted coffee beans are preferably obtained by heating green coffee beans and stopping said heating process before the end of the first crack.

Usually, using current roasting methods, the coffee bean will become more acid, more bitter, smokier, with burned notes as well as more greenish notes and more astringency. Across the bean, the inside and the surface are not homogeneously roasted. Said roasting methods will also generate more CO2; and the oil migration will be faster. Therefore, current fast roasting methods involve many quality disadvantages.

In embodiments of the invention, partially roasted coffee beans with a certain roast level are used. This means it is unnecessary to roast green coffee beans from scratch. To some extent, this concept avoids inhomogeneous roasting, which generally occurs due to long-term heating of a complete roasting process. Therefore, said partial roasting will provide for homogeneous roasting of the bean, with a balanced roasting taste and flavor, which means a milder taste. Above all, consumers will experience a very short roasting period (less than 4 minutes) without the need for higher temperatures (e.g., lower than 240° C.).

In an exemplary embodiment of the invention, the roasting process comprises:

Preparing coffee beans with a density below 0.5 g/ml or the moisture content is less than 6%; or the color of the beans is lighter than the targeted roasting degree and does not exceed 10 (L-value by Hunterlab);

Applying heat to these beans having a temperature of about 190-230° C. around the beans; by applying such a temperature, the high temperatures which are normally above 230° C., causing over-roasting of the surface of the beans, are avoided;

This ambient temperature (about 190-230° C.) of the beans will be maintained for less than 4 minutes;

The amount of energy transferred to the beans will be less than about 15 J.

The roasting time will be varied based on the target roasting degree (i.e. the final roast level). If the target roasting degree is darker, the roasting time will be longer; if the target roasting degree is relatively light, the roasting duration will be shorter. At the same time, if a relatively high temperature is used, the roasting duration will be relative short. The targeted density after roasting is in a range of, for example, 0.35 g/ml –0.30 g/ml.

In a preferred embodiment of the invention, before the roasting step, the roasting method further comprises a step of: obtaining a roast level of the partially roasted coffee beans, which is indicated by at least one of: moisture content, density and color of the partially roasted coffee beans.

As can be seen from the above exemplary embodiment of the invention, the roast level of the partially roasted coffee beans can be indicated by at least one of moisture content, density and color of the partially roasted coffee beans. All of these parameters can be used to indicate the roast level/degree of the partially roasted coffee beans. Of these parameters, moisture content is a relatively precise parameter, since the moisture content of all types of partially roasted coffee beans with a certain roast level/degree is somehow constant. It can be understood by those skilled in the art that, given a certain type of coffee beans, density and color of the partially roasted coffee beans can precisely indicate the roast level/degree as well.

Different coffee bean types have a significantly different roasting profile. For example, high-altitude hard beans, e.g. Mandheling and Hawaii Kona, are large, dense and have a high water content. Therefore, they need a long roasting time before the first crack to get rid of water. And they are suitable for dark roasting to fully develop their aroma and flavor. On the other hand, low-altitude beans, e.g. Yirgacheffe and Pahama, are thin, flat and have a low water content. They expand easily and have a good appearance during roasting, but dark roasting causes the aroma to disappear and makes them insipid.

According to the concept of roasting the partially roasted coffee beans, the coffee beans to be roasted could be partially roasted beans with different roast levels. Moreover, different types of coffee beans to be roasted need customized second-phase roasting profiles. As such, the recognition of beans to be roasted is important to decide about the roasting profile; otherwise consumers will have difficulty adjusting the roasting profile according to the various beans to be roasted.

Bean color has a strong correlation with roasting degree. The color of coffee beans changes significantly from green to pale, yellow, brown, and black with roasting time and high temperature. Specialty Coffee Association of America (SCAA) has developed a roast color classification system which is linked to 8 roasting degrees from light cinnamon roasting to Italian roasting. Meanwhile, bean color is one of the most convenient and powerful parameters to be measured. Professional instruments, such as Agtron and Huntlab, measure bean and powder color to indicate roasting degree. Experienced roasting practitioners normally check bean status, i.e. color, smoothness and expansion to determine the roasting endpoint.

An embodiment of the invention also proposes a recognition system for recognizing beans based on color to guide in achieving customized and optimized roasting profiles. The input beans are partially roasted beans rather than green beans, ideally beans from authorized suppliers, to support a segmented roasting concept. The recognition system is crucial for the segmented roasting technology, because it provides an optimized roasting profile for different partially roasted beans.

The principle of using color to recognize the input beans is applied as follows.

1) Bean color is linked with coffee bean variety, and thus determines the recommended roasting degree.
2) Bean color determines the roasting degree of partially roasted beans, which influences the final roasting time.
3) Bean color has a correlation with water content, which affects the roasting profile.

The recognition system could be used with a stand-alone roaster or it could be integrated into a coffee maker, together with grinding and brewing to offer coffee with various tastes.

The main elements for color recognition comprise a color chart, selection means and/or a software control panel to implement the recognition.

A color chart is a set of colors covering the colors of potential, commercially available coffee beans in a segmented roasting concept. Ideally, the color chart is developed according to authorized coffee beans.

A selection means is designed to get consumer input on bean status after comparing the bean(s) with a color chart.

A software control panel is designed to infer roasting degree from color input and to derive the corresponding roasting profile, i.e. controlled elevated temperature rate, duration time and final temperature.

Another UI design besides a device color chart can be an on-phone/on-tablet color chart via app synchronization; or a paper color chart whose result is input to the device.

Figure 1:
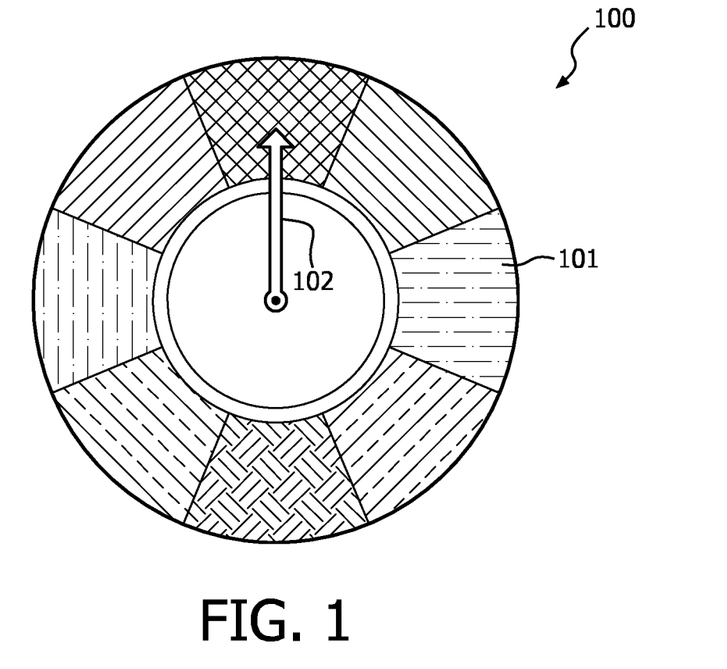
FIG. 1 shows a spin wheel recognition system according to an embodiment of the invention.

In general, a recognition system for input beans is designed to guide in achieving a customized and optimized roasting profile based on color. The recognition could be realized by comparing an input bean color with a pre-set color chart, and the matching color is manually selected. Software receives and analyzes the bean color, and further triggers a corresponding roasting profile. In combination with a grinding and brewing function, a fresh and tasteful coffee brew can be delivered in a convenient way. To implement a recognition system, four kinds of selection means along with an embodiment thereof are proposed in this invention, which will be described hereinafter with reference to a sketch (FIG. 1).

Example 1 of the selection means:

A spin wheel 100 has a color chart with a set of color zones 101. For the sake of simplicity, in FIG. 1, different patterns indicate different colors. Each color zone indicates a group of commercially available coffee beans as input beans to be roasted. A pointer 102 is rotatable and is located in the matching color zone to indicate the input bean type. Consumers can manually set the pointer to a specified color zone after comparison of input bean and color chart. Subsequently, the pointer triggers roasting profiles by means of a software control panel. The process of recognition is now finished. The roasting profile, which normally comprises a temperature and time control, is defined in advance and pre-set in the machine.

Figure 2:
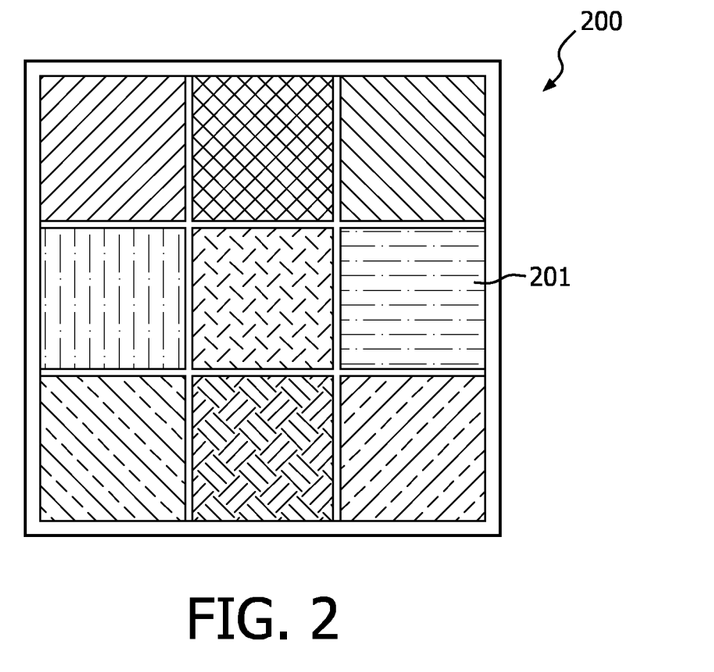
FIG. 2 shows a color panel recognition system according to an embodiment of the invention.

Example 2 of the selection means:

Alternatively, a color panel 200 is designed on the machine in FIG. 2. For the sake of simplicity, in FIG. 2, different patterns indicate different colors. A group of color bars 201 are arranged together to form a color panel. Each color bar indicates a type of commercially available coffee bean as input bean to be roasted. A color bar is not only used to compare input bean and color panel, but also serves to select a specified color. By pressing or touching a color bar, the color bar is linked with a corresponding roasting profile, and triggers a roasting process.

Figure 3:
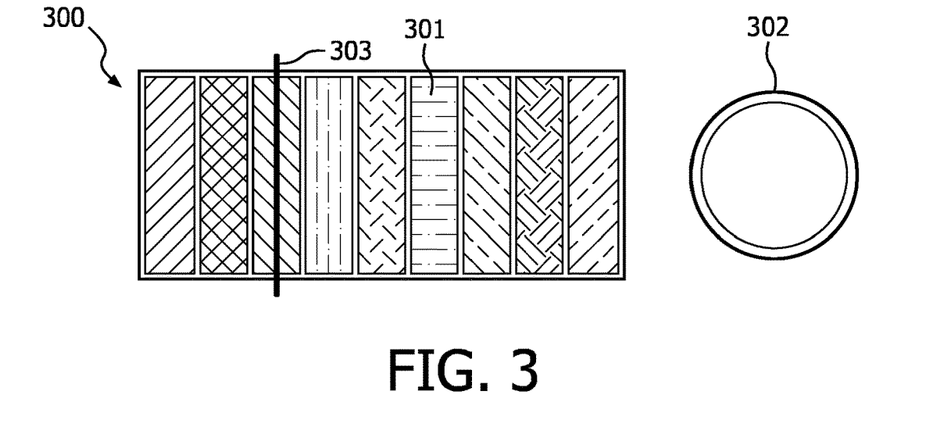
FIG. 3 shows a color tuner recognition system according to an embodiment of the invention.

Example 3 of the selection means:

Alternatively, a color tuner 300 is designed on the machine in FIG. 3. For the sake of simplicity, in FIG. 3, different patterns indicate different colors. A color tuner is full of individual color zones 301, indicating a type of commercially available coffee bean. A disc-shaped knob 302 is tuned together with needle 303 allocated at a specified color zone. The knob is pressed to trigger pre-set roasting profiles by means of a software control panel.

Figure 4:
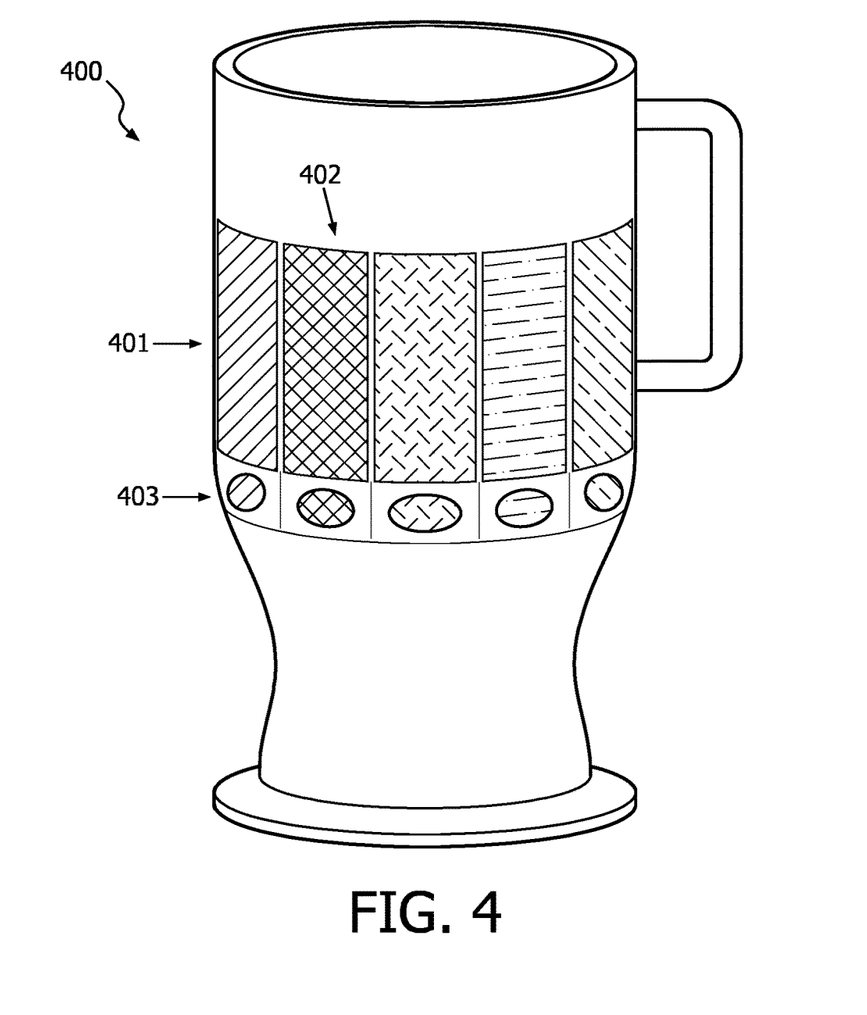
FIG. 4 shows a colored roaster chamber recognition system according to an embodiment of the invention.

Example 4 of the selection means:

Alternatively, a roaster chamber 400 decorated with color zone 401 has been designed (as shown in FIG. 4). For the sake of simplicity, in FIG. 4, different patterns indicate different colors. The roaster chamber can be made of transparent material, such as glass, engineering plastic. A color chart 402 is stuck to the outside of the chamber. Alternatively, it is sandwiched between two layers of the chamber. The chamber remains transparent with the color chart attached to it. A group of buttons 403 are allocated beneath the roaster chamber. The recognition process is performed as follows: Input beans are loaded into the roaster chamber. A consumer looks through the chamber (color zone) and decides what color matches that of the input bean. Subsequently, by pressing one of the buttons, the corresponding roasting profile is selected by means of the software control panel.

Some examples of the recognition system are provided below, demonstrating how to use the disclosed recognition system to determine a roasting profile.

Sumatra Mandheling is large in size, and dense. The green bean has a dark green color, with a relatively high water content (~12%). Considering its features, heat penetration is normally poor during roasting. Therefore, the roasting duration before first crack is long to achieve water evaporation in order to avoid a nonuniform roast. The roasting degree should be a dark roast to generate a multi-layered, full-bodied taste.

On the other hand, Ethiopia Yirgacheffe is small in size and pale green in color. The water content is also low (~10%). It is roasted uniformly due to good heat penetration properties of the bean. The final roasting degree should be a light roast because extra roasting reduces aroma and flavor.

Partially roasted Mandheling and Yirgacheffe are dark green and pale green in color, respectively. The recognition is thus achieved by comparing color chart and input bean. The corresponding roasting profile is pre-set as described. A more elevated temperature rate, longer duration and high plateau roasting temperature is demanded for Mandheling as compared to Yirgacheffe. The roasted Yichacheffe is a light roast, while the roasted Mandheling is a dark roast.

Preferably, the step of obtaining comprises: sensing at least one of: moisture content, density and color of the partially roasted coffee beans; or recognizing the roast level of the partially roasted coffee beans by means of an indicator.

It should be noted that, on the one hand, these parameters can be detected by one or more sensors; on the other hand, the roast level of the partially roasted coffee beans can also be recognized by means of an indicator. Such recognizing comprises "reading out" said roast level from, for example, the packet of partially roasted coffee beans, or "inputting" the roast level of the partially roasted coffee beans by the customer after comparing the coffee beans with a standard color chart.

In a preferred embodiment of the invention, the roasting profile for roasting is determined based on the roast level of the partially roasted coffee beans and a predetermined final roast level.

According to the invention, segmented roasting involves two stages of roasting of coffee beans, with the second stage being performed by the consumer. An embodiment of the invention also proposes a way to control the second stage of roasting based on the properties of the partially roasted beans (i.e. the roast level of the partially roasted coffee beans).

Currently, dried green coffee beans are roasted by the roasting industry and shipped to the shop where they are placed in the shelf. Consumers can buy the roasted coffee beans and make coffee at home using coffee makers. During this process, some taste/fragrance will be lost. This applies especially for the dark roasted beans, which have oil on the surface; therefore, fragrance and flavor are lost more easily. Meanwhile, since the taste profile is pre-decided by the roasting industry, there is limited opportunity for consumers to develop their personal preference.

In order to have fresher and better tasting coffee, and to allow consumers to develop their own preference(s), the inventor proposes to segment the roasting process.

Based on the roast level of the received beans and optionally the target roast level or target taste, a roasting profile will be selected for the beans.

As described above, the roast level of the received, partially roasted beans can be obtained in a number of ways: such as user input (e.g. selection of the level), sensing (e.g. a color sensor to detect the roast level), or machine readable input (e.g. scanning the bar code, RFID on the packet etc.).

Preferably, the roasting device can use the input bean roast level and the target/final roast level and determine a roasting profile from these two levels. The factors used to determine the roasting profile are not limited to the input and final roast levels, and the device may take account of other factors (e.g. ambient temperature, age of the beans, type of the beans or some specifics of the first roasting stage).

The roast level of the input beans may be specified either directly or indirectly, wherein directly means that it can be a roasting degree (e.g. on a scale of 0 to 10 or as a roast color) and indirectly means that it can be specified by other relevant parameters (e.g. moisture content, density, . . . ).

A simplified case is when only a single roast level is used and the roasting profile is determined by the roast level of the partially roasted beans and the final target.

The roasting profile used need not be completely fixed but can be adapted during operation based on some sensor feedback.

Table 2 shows a basic case where a lookup table is used, Px,y means the roasting profile, using beans of roast level x to produce beans of roast level y.

TABLE 2

Lookup table to determine the roasting profile (can be a fixed time/temperature curve or can include rules for dynamic control)

| | Target | | | | | |
|---|---|---|---|---|---|---|
| Input | 7 | 8 | 9 | 10 | 11 | 12 |
| 4 | P4,7 | P4,8 | P4,9 | P4,10 | P4,11 | P4,12 |
| 5 | P5,7 | P5,8 | P5,9 | P5,10 | P5,11 | P5,12 |
| 6 | P6,7 | P6,8 | P6,9 | P6,10 | P6,11 | P6,12 |
| 7 | | P7,8 | P7,9 | P7,10 | P7,11 | P7,12 |
| 8 | | | P8,9 | P8,10 | P8,11 | P8,12 |

The roasting profile could be a fixed time/temperature curve or it could define the target values of certain sensor output and control the roasting based on the sensor output.

The key is that the applied roasting profile will be different depending on the properties of the received beans. Based on the roast level of the received beans and the target roast level, the device will determine a roasting profile. This could be static (so once chosen, it is fixed) or dynamic (can be adapted during roasting). The roasting profile may be determined based on other factors such as ambient temperature, age of the beans, type of the beans or the specifics of the first roasting stage.

An extreme case is when the input determines the roasting profile for the beans, and it will necessarily depend on the roast level of the received beans.

Figure 5:
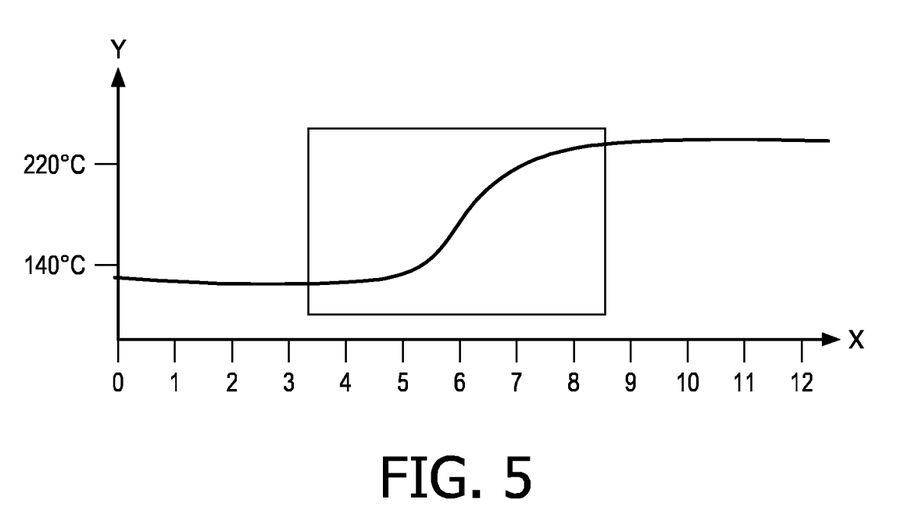
FIG. 5 shows an example of a complete roasting profile used to select the profile for second stage roasting according to an embodiment of the invention.

The roasting profile could be static. FIG. 5 shows an exemplary roasting profile from green beans to fully roasted beans. In FIG. 5, the horizontal coordinate indicates roast level, and the vertical coordinate indicates temperature used in the roasting profile. Assuming that input beans are at one of these predetermined levels and the target result is one of the later levels, the device could simply select the roasting profile to go from the input level to the final level.

In practice, there may be a plurality of such profiles to select from, based on the bean type or specifics of the first roasting stage.

In FIG. 5, one example (P4,9) is indicated in the rectangle, meaning the roasting profile to be applied to the received beans of roast level 4 in order to produce beans of roast level 9. Similarly, other cases can be selected from this profile.

An alternative embodiment makes use of one or more sensors to control the final roasting. The sensor values will be used to determine the starting point and the end point. In practice, the starting point need not be explicitly identified but the sensors will control the process so that the desired end point is reached. This will result in a different roasting profile for received beans with a different roast level.

Optionally, the predetermined final roast level is determined directly as one of a discrete set of defined roast levels (e.g. [0, 1, 2, . . . , 12]); or, the predetermined final roast level is determined directly as the level within a continuum of roast levels (e.g. 0-12).

Optionally, the predete rmined final roast level is determined indirectly based on parameters such as moisture content, density, . . . (a sensor is not required in this case); or, the predetermined final roast level is determined indirectly based on the output of one or more sensors.

Optionally, the specification of the roasting profile is input to the device.

In an embodiment of the invention, the step of roasting comprises applying heat to the partially roasted coffee beans having an ambient temperature which ranges from about 190° C. to about 230° C., and/or transferring thermal energy of less than about 15 J to each partially roasted coffee bean.

Roasting green coffee beans will take up more time. If consumers want to have a very fast roasting process, an extremely high temperature will be required (normally higher than 300° C.). Since the partially roasted coffee beans have already been pre-roasted (e.g., to a level not exceeding the first crack), less heat will be needed to roast the beans to the predetermined final roast level. Therefore, intensive heating will be avoided, which would otherwise probably cause inhomogeneous roasting.

An embodiment of the invention also proposes a solution where the sensor target values are entered into the device in a machine-readable form. The device will control the final roasting step based on the input sensor target values.

Segmented Roasting proposes a model where the initial roasting of coffee is performed by professional roasters and the final roasting stage is performed by the consumer. The properties of the partially roasted beans are controlled by the roasters or the roasting device. The consumer device can control the final roasting step to deliver the target result.

Sensing can be used to control the final roasting step based on, for example, color sensing. However, depending on the type and partially roasted status of the beans, the ideal final color may differ. Thus, according to a general solution all beans will be roasted to a common level, whereas the ideal solution is to roast each partially roasted bean variety to its optimum level. Especially for coffee beans, the character will vary each year. The ideal or recommended roasting method is studied each year after the beans are harvested. The professional roasters who provide the partially roasted bean or the final roasted bean know the ideal roasting target. If this ideal target could be "updated" for the final roasting by the consumer device, consumers could enjoy coffee made from ht roasted beans.

Preferably, the predetermined final roast level is indicated by at least one of: moisture content, density and color of the partially roasted coffee beans; and the predetermined final roast level is adjustable according to user preference.

An embodiment of the invention proposes a solution where the sensor target values are entered into the device in a machine-readable form. The device will control the final roasting step based on the input sensor target values.

The intention is to input specific values that directly relate to sensors present in the device. These values are not intended to be intelligible for consumers and therefore can be entered in a machine-readable format.

For example, the machine readable input could include the sensor targets for three possible roast levels based on RGB values from a color sensor:

For a Mandheling bean, for example, the input is:

|  | R | G | B |
|---|---|---|---|
| Light Roast | 100.5 | 88.3 | 73.4 |
| Medium Roast | 73.0 | 68.8 | 64.2 |
| Dark Roast | 55.5 | 58.4 | 55.9 |

For the next roasting, if the bean type changed to Yirgacheffe, for example, the input target will be:

|  | R | G | B |
|---|---|---|---|
| Light Roast | 76.1 | 61.2 | 45.3 |
| Medium Roast | 53.0 | 44.6 | 35.5 |
| Dark Roast | 43.3 | 44.9 | 42.1 |

Using a possible real-life example, a user may add beans to the device, and he/she inputs the sensor targets for these specific beans to ensure the device can optimally control the final roasting step.

As described above, the sensing targets may be entered in a number of ways: such as scanning the barcode (linear, 2D) on the packaging, RF ID tags, or using apps on smart phone/tablet.

The sensor types used are not limited to color but may also include, e.g. moisture level (and the related moisture loss parameter).

The actual physical sensors in the device need not correspond directly to the inputted sensor targets, there could be a mapping from the physical sensors to the sensor targets. For example, the inputted sensor target could be moisture loss, but the actual physical sensor used to detect moisture loss is a weight scale.

The solution achieved when a sensor target value is input can involve a number of modes:
1. Input of only final sensor targets (assuming that a standard cooking program is used);
2. Input of both the final sensor targets and the target roasting profile;
3. Input of multiple sensor targets for intermediate results (using either standard roasting program per segment or input of target roasting profile per segment);
4. Input of multiple final sensor targets (and target roasting profiles) plus multiple initial sensor values such that the final sensor target and/or roasting profile is dependent on the initial sensor value.

Multiple sensor targets may be captured by a single or multiple sensor components.

Figure 6:
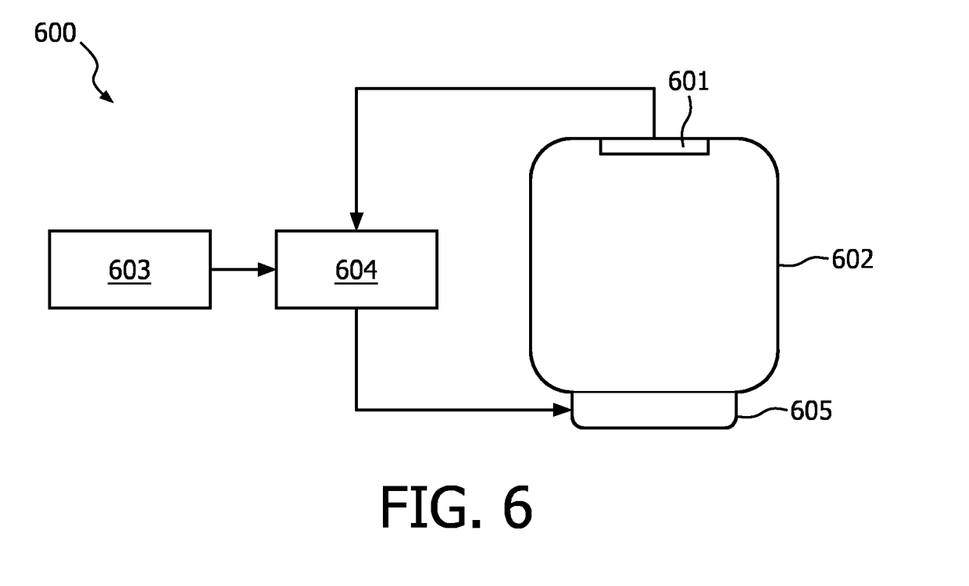
FIG. 6 shows an example of a roasting device with a sensor according to an embodiment of the invention.

The basic setup of the embodiment is shown in FIG. 6. A device 600 for roasting coffee beans includes one or more sensors 601 in a container 602, and an interface 603 (wired/wireless) to receive input. The input will include target values for the sensors 601 to indicate completion of the roasting process. A control unit 604 controls a heating unit 605 according to a roasting profile, which roasting profile can be determined from the target values and/or the roast level of the received partially roasted beans in the container 602.

Without input of sensor targets, a system as shown in FIG. 6 has the problem that the sensor may control the roasting without specific knowledge of the bean type and roast level. In some cases this may lead to a suboptimum result.

Preferably, the roasting method further comprises: sensing the roast level during the step of roasting; and stopping the roasting process when the predetermined final roast level is achieved.

Based on the solution achieved when a sensor target value is input, 4 modes will be described below.

Mode 1: Input of only final sensor targets (assuming that a standard roasting profile is used).

In this case, it is assumed that a standard roasting profile is used and the input sensor targets are used to determine the endpoint of the process.

Assuming that the device can measure sensor values $S1, S2, \ldots, Sn$, the sensor target input should be a subset of $S1, S2, \ldots, Sn$. The cooking process will be controlled based on the input subset (e.g. $S1, S2, \ldots, Sk$, where $k \leq n$).

The ideal algorithm is:

IF $(S1A, S2A, \ldots, SkA) = (S1T, S2T, \ldots, SkT)$

THEN the cooking/brewing process is complete.

In said algorithm, SiA is the actual sensor value and SiT is the target value.

However, in practice, due to the sampling rate, sensor resolution and natural fluctuations in the values, SiA may never precisely equal SiT.

A practical algorithm is to check:

IF $SiA = SiT \pm \Delta$

Where $\Delta$ may be a percentage of the target value.

More generally, the system should define a measure function F on the sensor k-tuple (i.e. a function that maps $(S1, S2, \ldots, Sk)$ to a non-negative value) and then the test is:

Whether or not $f(S1T-S1A, S2T-S2A, \ldots, SkT-SkA) < \Delta$

The measure function can be used to differentiate between parameters in terms of importance.

The measure function can also be one of the inputs to the system along with the sensor targets.

The overall control algorithm is:
1. Receive target sensor values $S1T, S2T, \ldots, SkT$
2. Start cooking/brewing (typically heating)
3. Take sensor value readings $S1A, S2A, \ldots, SkA$
4. IF $f(S1T-S1A, S2T-S2A, \ldots, SkT-SkA) < \Delta$ THEN step 5 OTHERWISE step 3
5. Process is complete (stop cooking/brewing)

Specifically, suppose the sensors in the device can measure weight change and RGB color during roasting. However, the sensor targets are defined only for weight and GB color components.

For example, the targets are:

Weight: −12%±0.01% (target is a 12% weight reduction during roasting)
R: 61.3±3
G: 52±3
B: 43±1

The targets include the allowed delta to meet the targets. By specifying the delta it is possible to make one sensor parameter more critical than another (i.e. parameters with a large (normalized) delta are in practice less critical).

Mode 2: Input both the final sensor targets and the target roasting profile.

In this case, the input also includes the roasting profile (e.g. the target temperature and/or other parameters for cooking) The control unit will set the device parameters based on this profile until the sensor targets are reached.

For example, the roasting profile is simply to heat to 200° C. until the sensor target is reached.

Mode 3: Input multiple sensor targets for intermediate results (using either standard roasting profile per segment or input target roasting profiles per segment).

In this case, multiple sensor targets are input to control different steps in the roasting process:
Step 1: S1T, S2T, . . . , SkT
Step 2: S1T, S2T, . . . , SkT
Step 3: S1T, S2T, . . . , SkT The control algorithm will follow the algorithm of Level 1 above for each step. The assumption is that the roasting profile varies for each step (could be input along with the sensor targets).

The sensor targets for each step need not use the same set of sensors. For example:
Step 1: Weight −6%±0.1% (the final roastmight require a weight reduction by 12%, but in the first stage, only 5% of weight reduction is required.)
Step 2: R: 61.3±3; G: 52±3; B: 43±1.

In this case, the first step is to control the weight loss, whereas the second step (using a higher temperature) achieves the target roasting level.

Mode 4: Input multiple final sensor targets (and target roasting profiles) plus multiple initial sensor values such that the final sensor targets and/or roasting profiles are dependent on the initial sensor value.

The basic idea is that the sensor targets are based on the ingredients and therefore more accurate control is possible. A further refinement is to use initial sensor values to select the final target. This makes it possible to take account of variations within the same type of ingredients (e.g. due to aging) or to reduce the variation in information that is input for the same class of ingredients.

In this case the input will include a set of pairs of initial sensor values (specific values or a range) and target sensor values as described above.

The actual initial sensor values will be used to select the sensor targets. If the initial sensor input is a set of specific values then the closest match can be selected. If the input is a range then the appropriate range will be selected based on the actual sensor values.

The initial sensor values refer to the actual values at the start of the process but not necessarily to instantaneous measurements at the start. They could also be measurements taken during the first few minutes of the process.

In this example, the input includes initial values which then control the profile and the target final result. Depending on how the coffee beans are stored, their properties may change, for example, they may lose or absorb moisture. By adding the initial sensor values, this can be compensated for to deliver an optimum final result.

For example, moisture content could be the initial parameter measured to control the roasting profile and is linked to the final result. Table 3 shows such an example.

TABLE 3

| Initial Sensor (moisture content) | Roasting Profile | Final Target |
| --- | --- | --- |
| >8% | 200° C. (5 mins) | R = 61.3 ± 3, G = 52 ± 3, B = 43 ± 1 |
| 4-8% | 180° C. (2 mins), 200° C. (1.5 mins) | R = 61.3 ± 3, G = 52 ± 3, B = 43 ± 1 |
| <4% | 180° C. (1.5 mins), 200° C. (1 mins) | R = 61.3 ± 3, G = 52 ± 3, B = 43 ± 1 |

In this way, variation of the beans during storage (including aging) can be compensated.

According to another aspect of the invention, an embodiment of the invention provides a method of making coffee, the method comprising: the roasting method of roasting partially roasted coffee beans as described above; grinding the coffee beans having the predetermined final roast level to coffee powder; and using the coffee powder to brew coffee.

With such a configuration, a very short bean-to-cup time and thus instantly fresh-brewed coffee is available, since the fast roasting process according to the invention will not only make the roasting period very short (the required energy will be less), but will also provide beans that are much more homogeneously roasted.

According to yet another aspect of the invention, a roasting device for roasting partially roasted coffee beans is proposed, the roasting device comprising: an obtaining unit for obtaining a roast level of the partially roasted coffee beans; a determining unit for determining a roasting profile for roasting based on at least the roast level of the partially roasted coffee beans; and a roasting unit for roasting the partially roasted coffee beans according to the determined roasting profile.

With such a roasting device, the roasting process will be very short, the required energy will be less, and the roasting is much more homogeneous.

Preferably, the roast level of the partially roasted coffee beans is indicated by at least one of moisture content, density and color of the partially roasted coffee beans; the obtaining unit comprises: a sensing element for sensing at least one of moisture content, density and color of the partially roasted coffee beans; or a recognizing element for recognizing the roast level of the partially roasted coffee beans by means of an indicator.

In an embodiment of the invention, the roasting unit roasts the partially roasted coffee beans according to a roasting profile, which is determined according to the roast level of the partially roasted coffee beans and the predetermined final roast level.

Preferably, the recognizing element is adapted for recognizing the roast level of the partially roasted coffee beans and/or the predetermined final roast level, and/or is adapted for selecting the roasting profile.

In an embodiment of the invention, the roasting unit is adapted for applying heat to the partially roasted coffee beans having an ambient temperature which ranges from about 190° C. to about 230° C., and/or transferring thermal energy of less than about 15 J to each partially roasted coffee bean.

According to still another aspect of the invention, a coffee machine is proposed, the coffee machine comprising: the roasting device for roasting partially roasted coffee beans as described above; a grinding device for grinding the coffee beans having the predetermined final roast level to coffee powder; and a brewing device for brewing coffee from the coffee powder.

Such a coffee machine potentially makes it possible to instantly brew coffee directly from partially roasted coffee beans.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A roasting device for roasting partially roasted coffee beans, the roasting device comprising:
   an obtaining unit configured to obtain a roast level of the partially roasted coffee beans prior to roasting by the roasting device;
   a determining unit configured to determine a roasting profile for roasting based on at least the roast level of the partially roasted coffee beans prior to the roasting by the roasting device, wherein the determining unit determines the roasting profile further based on the roast level of the partially roasted coffee beans prior to the roasting by the roasting device and a predetermined final roast level; and
   a roasting unit that roasts the partially roasted coffee beans according to the roasting profile.

2. The roasting device according to claim 1, wherein the roasting unit is configured to apply heat to the partially roasted coffee beans, the heat having an ambient temperature which ranges from 190° C. to 230° C., and/or transfer thermal energy of less than 15 J to each partially roasted coffee bean.

3. The roasting device of claim 1, wherein the obtaining unit includes a sensor configured to sense at least one of moisture content, density and color of the partially roasted coffee beans.

4. The roasting device of claim 1, wherein the obtaining unit includes a recognizer configured to recognize the roast level of the partially roasted coffee beans by an indicator.

5. The roasting device of claim 4, wherein the indicator is machine readable data.

6. The roasting device of claim 5, wherein the machine readable data is included in one of a bar code and a RFID on a packet containing the partially roasted coffee beans.

7. The roasting device of claim 4, wherein the indicator includes a color chart and a selector for selecting a color from the color chart that matches a color of the partially roasted coffee beans.

8. The roasting device according to claim 7, wherein the color chart is attached to a roaster chamber for selecting a color from the color chart that matches a color of the partially roasted coffee beans.

9. The roasting device of claim 1, wherein the predetermined final roast level is adjustable according to user preference.

10. A coffee machine, the coffee machine comprising:
    the roasting device according to claim 1 for roasting partially roasted coffee beans;
    a grinding device for grinding the coffee beans having the predetermined final roast level to coffee powder; and
    a brewing device for brewing coffee from the coffee powder.

* * * * *